United States Patent [19]

Newell

[11] 4,105,218

[45] Aug. 8, 1978

[54] PORTABLE PALLET CARRIERS

[76] Inventor: George Newell, 119 Helene Rd., Valley Cottage, N.Y. 10989

[21] Appl. No.: 821,155

[22] Filed: Aug. 2, 1977

[51] Int. Cl. .............................................. B62d 21/18
[52] U.S. Cl. .............................. 280/43.12; 280/43.17
[58] Field of Search ..................... 280/43, 43.17, 43.12, 280/43.24, 79.1 R

[56] References Cited

U.S. PATENT DOCUMENTS

| | | | |
|---|---|---|---|
| 2,251,567 | 8/1941 | Gould | 280/79.1 R |
| 2,572,348 | 10/1951 | Johnson | 280/43.24 |
| 3,290,051 | 12/1966 | O'Brien | 280/43.12 |

*Primary Examiner*—Robert R. Song
*Attorney, Agent, or Firm*—Robert E. Burns; Emmanuel J. Lobato; Bruce L. Adams

[57] ABSTRACT

Portable pallet carriers for lifting a pallet and converting it into a knock-down, portable truck that can be readily assembled to move a load about. Two pairs of carriers are detachably attached to a conventional pallet adjacent the four corners thereof. Each carrier has an elongated, rigid arm that is inserted into the pallet underlying the top or platform crosspieces of the pallet and is removably attached thereto without modification of the pallet. The support arm is provided with a guide slot normal to its longitudinal axis within which is slidably guided a guide plate connected to a caster mount that is moved to two terminal positions on opposite sides of the longitudinal axis of the support arm so that the support arm raises or lowers the pallet as the caster mount is moved to its terminal positions. In order to move the caster mount, an operating linkage connects the caster mount to the support arm. The linkage cams the caster mount to its two terminal positions under control of an operating handle which is one of the links of the linkage system. A caster wheel is mounted on the caster mount of the corresponding carrier.

5 Claims, 8 Drawing Figures

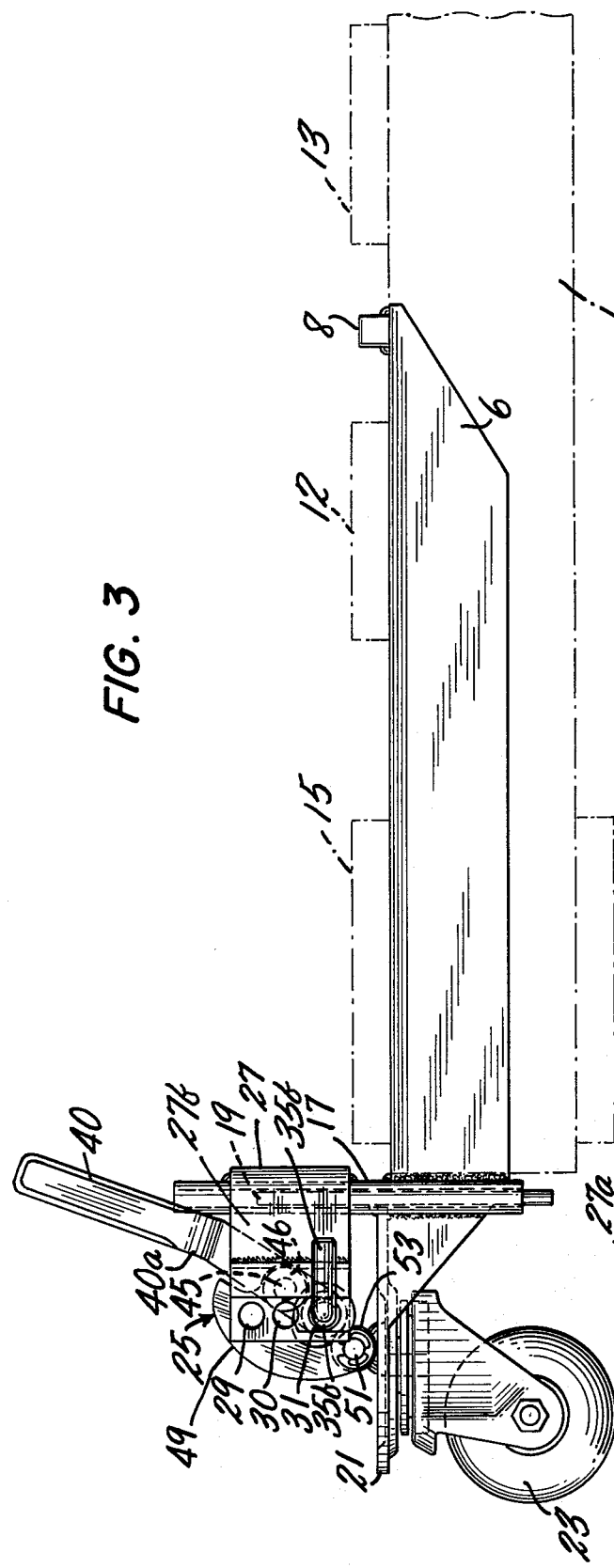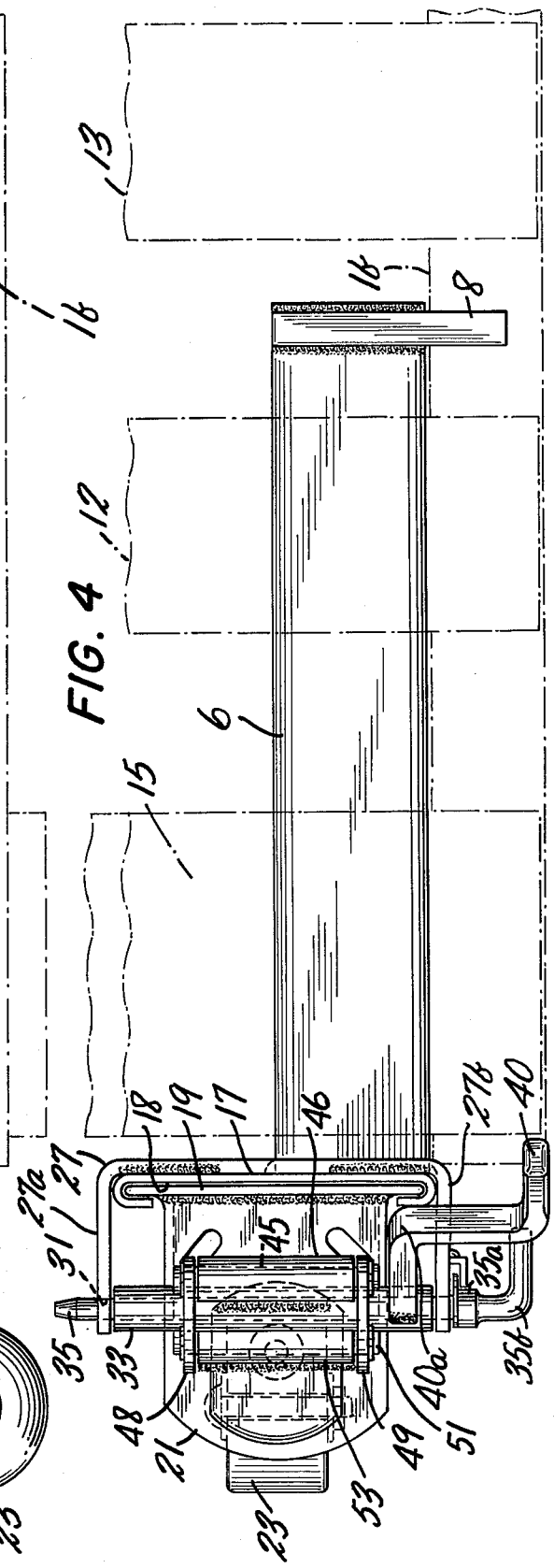

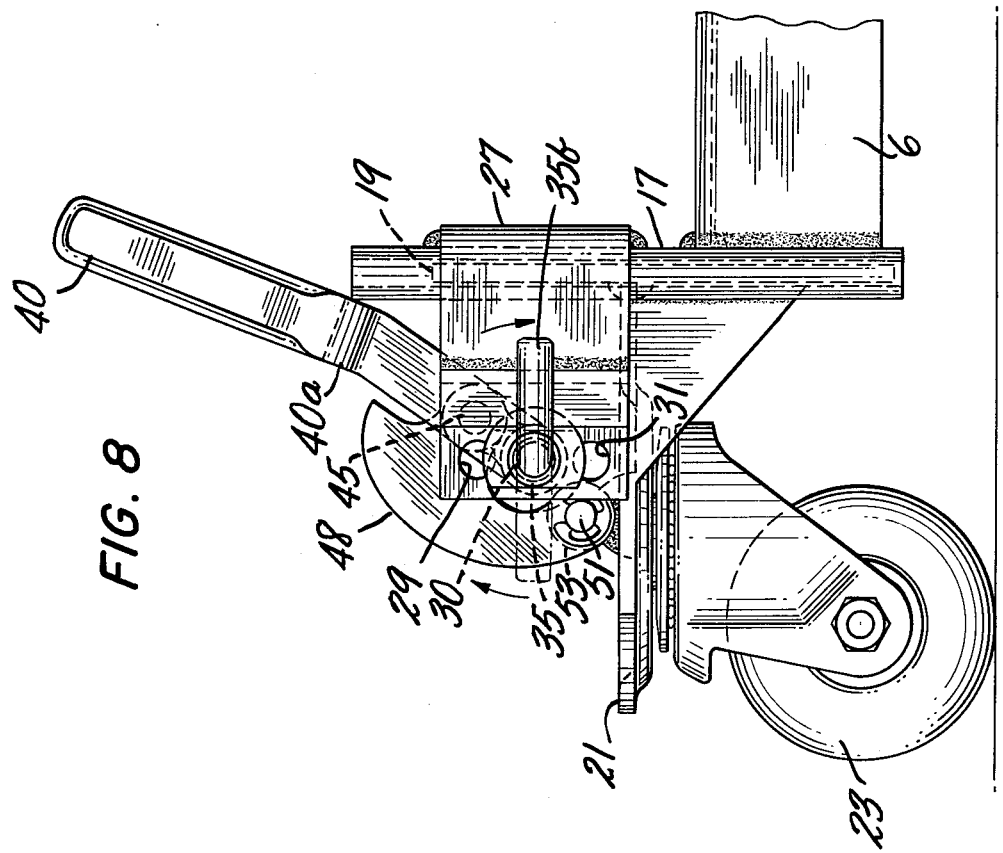
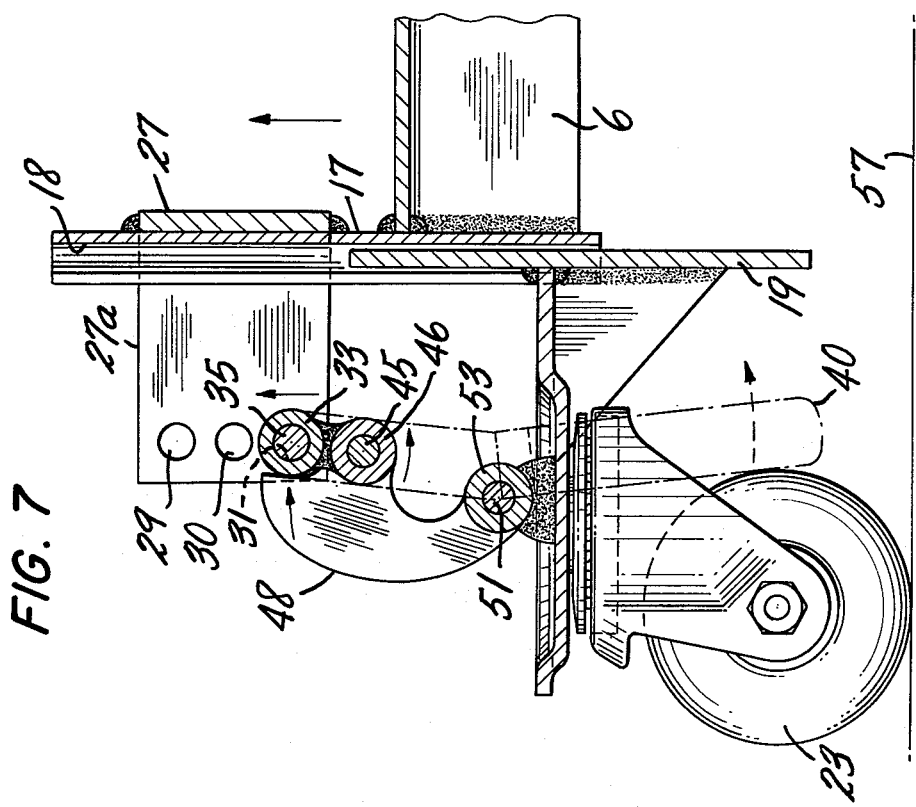

PORTABLE PALLET CARRIERS

BACKGROUND OF THE INVENTION

This invention relates generally to portable trucks and more particularly to a portable pallet carrier construction used for converting a standard pallet into a knock-down truck.

Pallets upon which articles are carried in a stacked condition in considerable heights so that the total weight of the load is large are known and are used extensively in industry and other places in connection with the transporting of articles from one place to another. The pallets heretofore have rested upon the floor and are built so that lift trucks with elevating forks pick-up the pallets and carry them from place to place.

Portable pallet mounting structures such as that shown in U.S. Pat. No. 2,572,348 are known. These mounting structures provide a mounting for pallets which may be operated to lift a pallet above the floor whereby the pallet becomes a truck and the articles on it are pushed by hand. These caster mounts are detachable and in use are manually turned from a position in which the pallet rests on the floor of the factory or are operated to a position where the pallet is in a lifted condition.

There are other types of pallet movers such as a pallet bin carrier construction disclosed in U.S. Pat. No. 3,290,051 and there are portable trucks such as that disclosed in U.S. Pat. No. 3,290,051 and there are portable trucks such as that disclosed in U.S. Pat. No. 720,569 granted on Mar. 10, 1903 to J. E. Dilger. All these known pallet movers and portable trucks are either complex or cannot be used on conventional pallets without modification of the pallets.

SUMMARY OF THE INVENTION

It is an object of the present invention to provide a portable pallet carrier constructed to be used with similar carriers in converting conventional pallets to knock-down trucks without modifications to the pallets.

The portable pallet carriers according to the invention are used by detachably connecting four of them adjacent the corners of a pallet. Each pallet carrier has an elongated, rigid, support arm which has a free end inserted in use into the paller underlying the platform cross-pieces thereof. This arm is provided with a finger which overlies the sill or corresponding runner of the pallet in a space between the crossboards. Means are provided for raising and lowering the support arm comprising a guide fixed on an end of the arm defining a guide slot which is normal to the longitudinal axis of the support arm and extends to opposite sides of the longitudinal axis. A caster mount extends from the support arm, as an extension, in a direction corresponding to the axial direction thereof and mounts a caster wheel thereon. A guide plate is fixed to the caster mount and is received in the guide slot and is movable up and down within the guide slot. The lowering and raising movement of the arm is actually effected by movement of the caster mount, by an operating linkage, and its guide plate which is guided in the slot. The operating linkage comprises a handle which is pivoted on a fixed pivot mounted on a fixed plate spaced from the axis of the support arm and fixed relative thereto.

A connecting link is pivoted on a pivot connected to the handle intermediate its free end and its pivot and is pivotally connected to the caster mount. As the handle is raised or lowered, the pivot connection of the connecting link connected thereto travels in an arcuate movement about the fixed pivot of the handle and the pivot arrangement and the configuration of the connecting link develop force components applied to the connecting link and effective in a plane parallel to the slot for moving the caster mount to a raised and a lowered position.

The movement of the handle which is part of the linkage to a raised position, raises the caster mount and accordingly in effect lowers the support arm. Lowering the handle moves the caster mount to a lowered position which corresponds to the raised position of the support arm in which case the pallet is lifted and rides on the caster wheels of the individual four pallet carriers and is accordingly converted into a truck.

BRIEF DESCRIPTION OF THE DRAWINGS:

Other objects and advantages will appear from the following description of an example of the invention, and the novel features will be particularly pointed out in the appended claims and drawings in which:

FIG. 3 is a side elevation view of a portable pallet carrier, according to the invention, and a pallet, fragmentarily shown;

FIG. 4 is a plan view of a portable pallet carrier construction in use on a pallet;

FIG. 7 is a side elevation view of the linkage mechanism illustrated in operative position with the pallet in a fully raised condition; and FIG. 8 is a fragmentary side elevation view of a portable pallet carrier illustrating the linkage mechanism with the linkage operating at a different pivotal connection to the support arm of the carrier.

DESCRIPTION OF THE PREFERRED EMBODIMENT

Figure 1:
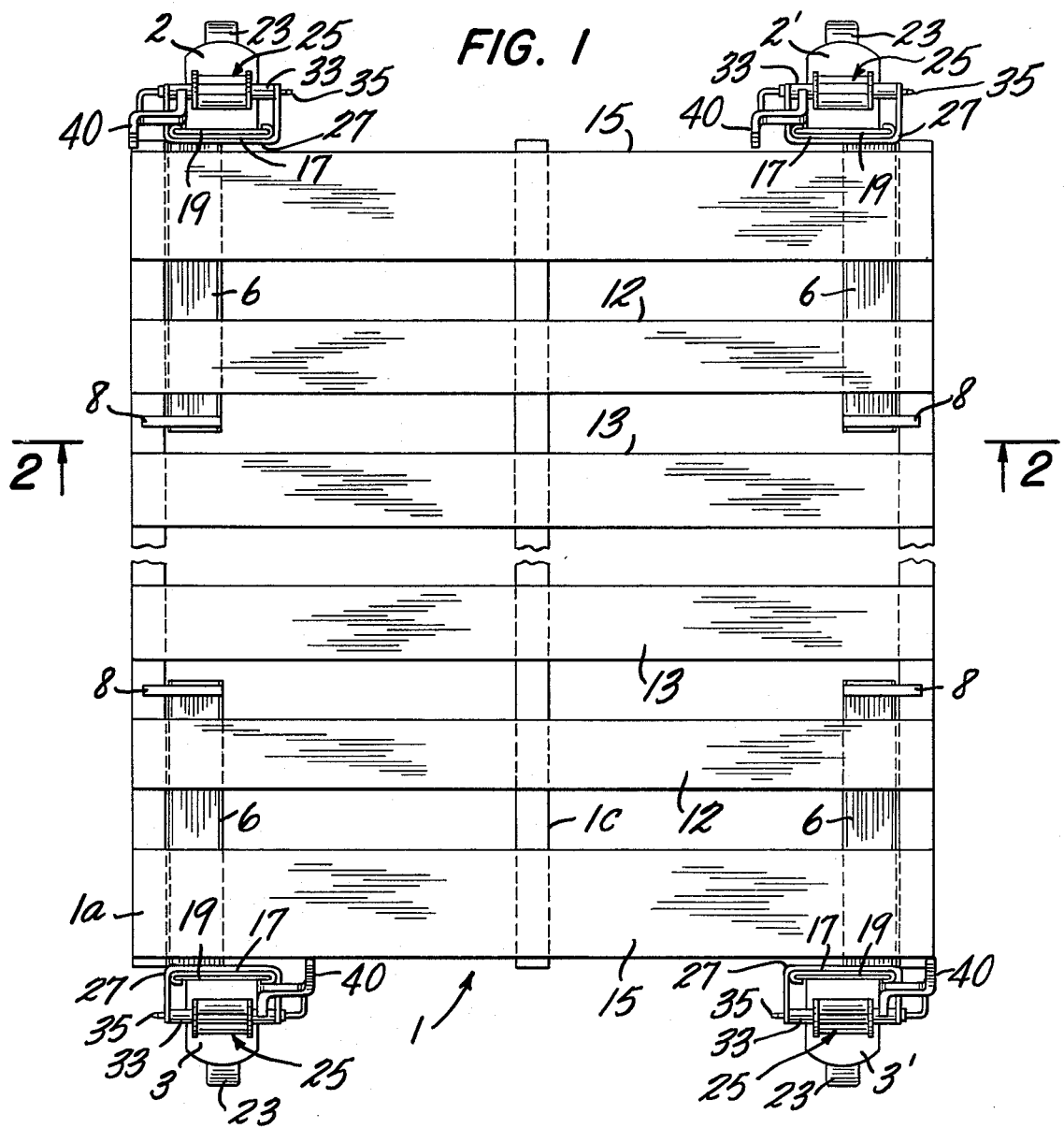
FIG. 1 is a plan view of a pallet provided with portable pallet carriers according to the invention.
Figure 2:
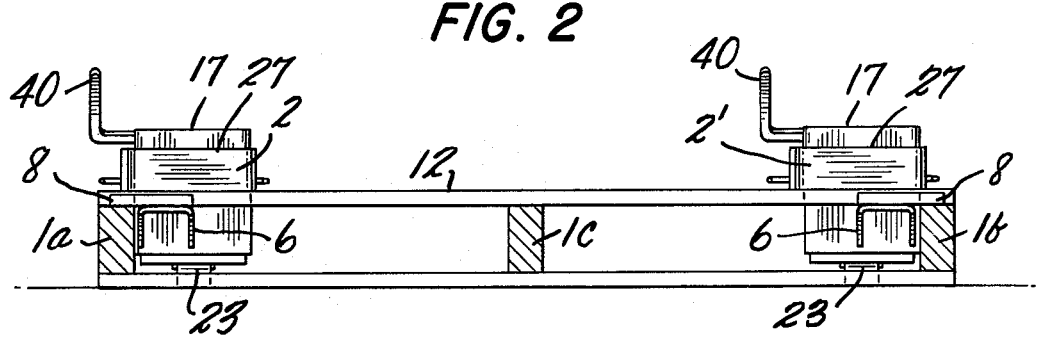
FIG. 2 is a section view taken along section line 2—2 of FIG. 1.

As shown in FIG. 1, a pallet 1 of conventional construction is provided with sills 1a, 1b and an intermediate sill 1c and crossboards secured thereto making a load platform thereon in known manner. The pallet is provided with four portable pallet carriers 2,2' and 3,3', adjacent the corners thereof for lifting it to a raised position for moving it about on wheels and lowering it for resting on the floor and removal of the carriers.

The carriers 2,3' and 2',3 at opposite corners of the pallet 1 are alike. All of the carriers are basically alike except for one minor difference in the two sets of carriers. Only one of the carriers will be hereinafter described in detail with respect to FIGS. 3-8 inclusive.

Each carrier comprises an elongated, rigid support arm 6 formed as a channel made of metal. This support arm is insertable into an open end of the pallet below the top platform as shown in FIGS. 3,4. The arm has a finger 8 welded to the top surface of the support arm 6 so that it will seat on the top surface of a sill 1b in a space intermediate two crosspieces or crossboards 12,13 of the pallet so that the carrier is releasably attached to the pallet 1. It will be noted that the support arm is sufficiently long to underly two of the crosspieces 12,15 of the pallet platform.

Provision is made in the individual portable carriers for lifting the respective support arms thereof to lift the pallet 1. The support arm is provided with a guide 17 welded at an end of the support arm. This guide is bent to define a slot 18 which is substantially normal to the longitudinal axis of the support arm 6 and extends on opposite sides of the axis as illustrated in the drawings. A guide plate 19 is received within the slot for movement in opposite directions as later described. A caster mount 21 is welded to the guide plate 19 and extends generally in the longitudinal direction of the support arm. A caster wheel 23 is fixed to the support arm.

An operating linkage 25 connects the caster mount 21 with the support arm. A U-shaped plate or mount 27 is welded onto the guide 17 and is in a fixed position spaced relative to the longitudinal axis of the support arm. This fixed plate 27 is welded to the guide 17 and is provided with three aligned openings 29, 30, 31 on its two legs 27a, 27b thereof. A sleeve 33 extends between the two arms 27a, 27b of the mount 27 and a pin or rod 35 extending therethrough and provided with a collar 35a and a grip 35b removably pivotally mounts the sleeve 33 rotationally on the mount 27. A handle 40 is welded to the sleeve 33 and has an offset 40a so that it extends outwardly and clear of the mount 27. The handle provides an operating link of the linkage 25 as hereinafter described.

Figure 5:
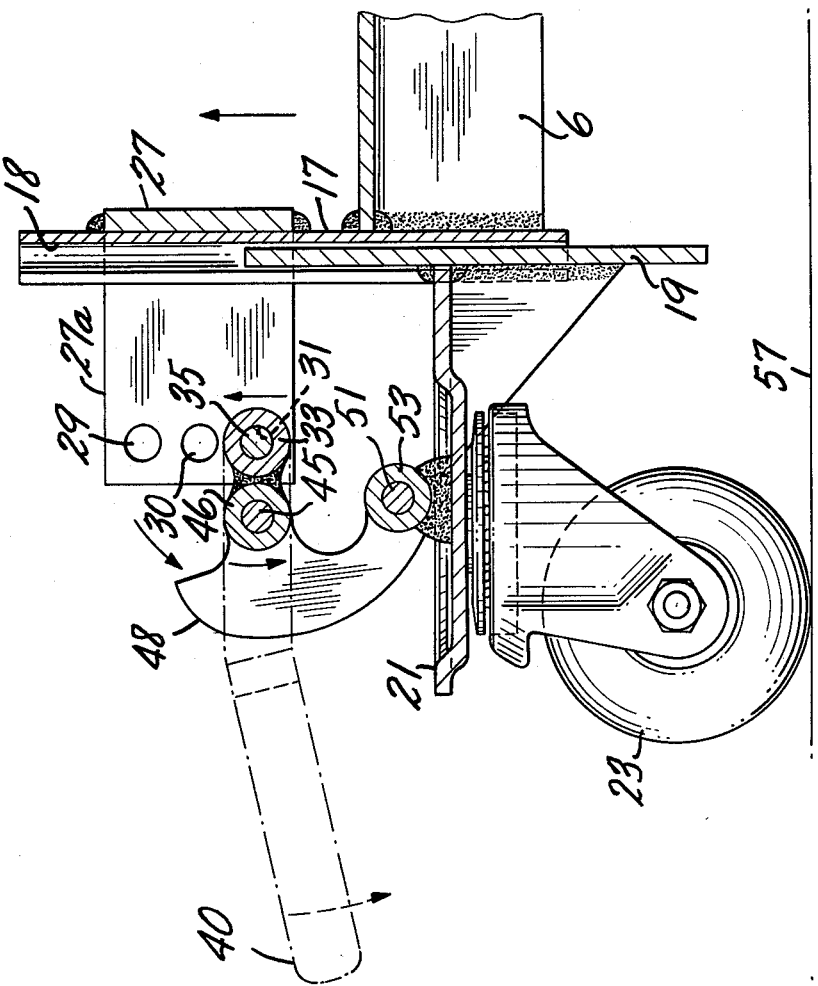
FIG. 5 is a fragmentary side elevation view of a portable pallet carrier illustrating an operating linkage mechanism of the portable pallet carrier according to the invention.
Figure 6:
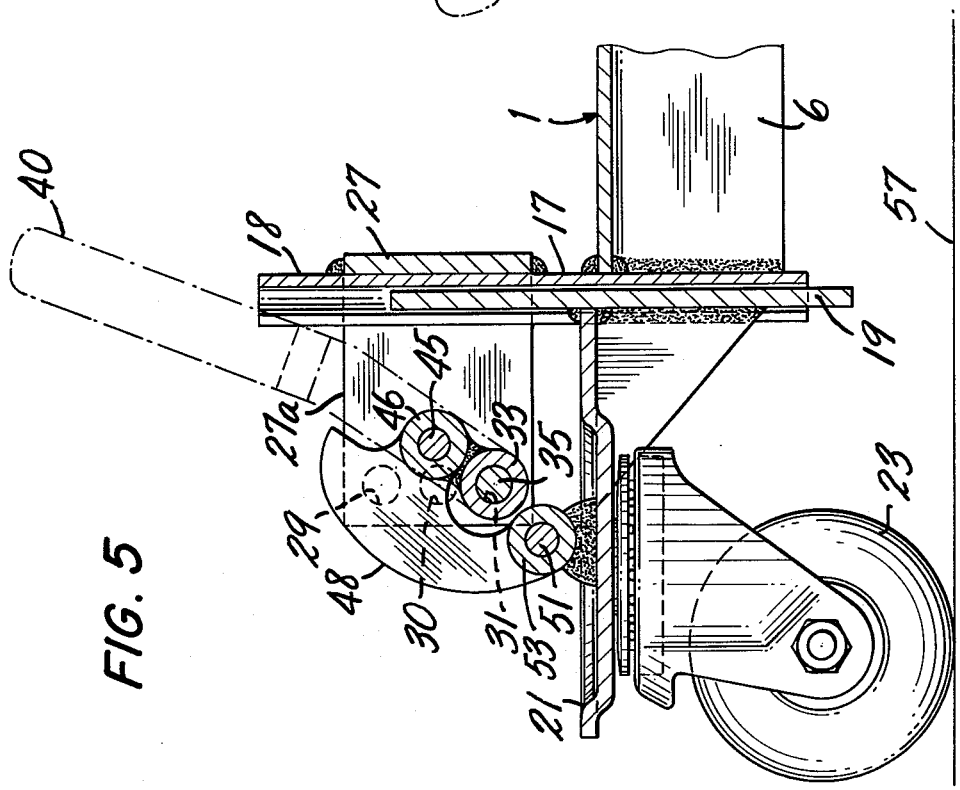
FIG. 6 is a fragmentary side elevation view of the mechanism illustrated in FIG. 5 illustrating an operative position thereof in which the linkage mechanism is effectively lifting a pallet.

A connecting link is pivotally mounted on a pivot pin 45 pivoted in a sleeve 46 welded to the sleeve 33. The connecting link is made up of two cams 48,49 each having a projection pivoted on the pivot 45 and each having an end pivoted on a pivot pin 51 housed in a sleeve 53 welded to the caster mount 21. When a free end portion of the handle 40 is actuated downwardly, as shown in FIGS. 6 and 7, from a raised position, corresponding to a retracted or raised position of the caster mount 21 and accordingly the lowered position of the support arms 6 in which it rests on the floor 57, as illustrated in FIG. 5, the pivot 45 travels in an arcuate path about the pivot 35. The cams 48,49 forming the connecting link are rotated in a counterclockwise direction as shown in FIG. 6. The relative position of the three pivots effects, during the movement, force components effective parallel to the slot. The pivot 51 moves downwardly, moving the caster mount downwardly relatively the arm 6. The corresponding wheel 23 engages the floor and as the downward movement of the handle continues the linkage raises the arm 6 thereby lifting the pallet 1.

Each of the portable pallet carriers is provided with a finger 8 for releasably securing the carrier to the pallet. Each finger 8 rests on the top surface of a corresponding sill of the pallet and accordingly can be thought of as a releasable connection and as a fulcrum point about which the lift forces developed by movement of the corresponding handle are applied. Two carriers 1a, 2′ have the corresponding finger 8 similarly arranged extending toward to a same side of the related support arm 6, and the two other carriers 1b, 2 have the corresponding finger 8 arranged extending away from the opposite side of the corresponding support arm 6 as can be seen in FIG. 1.

The two sets of openings in the legs of the mount plate 27 provide for varying the height to which the pallet can be raised by providing three separate positions in which the pivot 35 can be located. For example, in the illustrations in FIGS. 3–6, the pivot 35 is at its lowermost position at 31. In the illustration in FIG. 8, the pivot 35 has been retracted and removed and inserted back in the middle opening 30 of the mount 27 so that the actuation of the handle 40 results in movement of the connecting link about a different pivot point so that the height of the pivot 35 is lower relative to the floor and the pallet is not lifted quite as high as in the use of the pivot 35 in its lowermost pivotal position.

Thus, those skilled in the art will readily understand that the portable pallet carriers according to the invention do not require any modification on the pallets on which they are used. The portable pallet carriers are easily transported for converting a conventional pallet to a movable truck which can be readily assembled or knocked down and pushed from place to place while supported by the four pallet carriers. One man can assemble the truck described above even when loaded and move the loaded truck about without need of other motive power.

It will be understood that the caster wheels can be of any suitable type or size. Two caster wheels may be of the type that do not swivel or they may all swivel.

I claim:

1. A portable pallet carrier comprising; an elongated, rigid support arm having a free end insertable into a pallet underlying the platform crosspieces thereof and having means on said support arm for releasably attaching the support arm to the pallet for raising and lowering the pallet as said support arm is raised and lowered; means for raising and lowering the support arm comprising a guide fixed on an end of said arm defining a guide slot normal to the longitudinal axis of said support arm and extending on opposite sides of said axis, a caster mount extending from said arm in a direction corresponding to an axial direction thereof, a caster wheel on said caster mount, a guide plate fixed to said caster mount for movement in said guide slot in opposite directions corresponding to an upward and a downward direction of movement of the caster mount, a pivot plate fixed relative to the support arm and spaced from said caster mount, an operating linkage for moving the caster mount and its guide plate guided in said slot in opposite directions, said operating linkage constituting an operating handle having an end pivoted on said pivot plate and a free end portion operable in opposite directions to two separate operative positions disposed on opposite sides of the longitudinal axis of the support plate, one operative position constituting a raised position of the handle corresponding to a lowered position of the support arm and the other operative position constituting a lowered position of the handle corresponding to a raised position of the support arm, a connecting link having a pivot connected to said handle intermediate a free end thereof and the pivoted end of the handle, a pivot pivotally connecting the connecting link to said caster mount, the pivot connected to said handle pivotally rotating about the pivot at the end of said handle as said handle is actuated, the pivots being relatively disposed for converting arcuate movement of the pivot on the handle about the pivot on the end of the handle to develop force components applied through said connecting link effective in a plane parallel to said slot for moving said caster mount to a raised and a lowered position thereby to lower and raise the support arm.

2. A portable pallet carrier according to claim 1, including means defining said pivot for the pivoted end of said handle and including means for removably mounting the last-mentioned pivot on said pivot plate, said pivot plate including means for mounting said last-mentioned pivot at different points for varying the height to which said support arm can be lifted.

3. A portable pallet carrier according to claim 2, in which said means defining the last-mentioned pivot connects said caster mount to said pivot plate thereby removably connecting said caster mount to said support arm, said slot having opposite ends open for allowing insertion and removal of said guide plate therein.

4. A portable pallet carrier according to claim 1, in which said means for releasably attaching the carrier to the pallet comprises a finger extending laterally of the support arm.

5. In combination, a pallet having elongated sills spaced laterally and extending longitudinally in a generally same direction and having a top platform defined by spaced crosspieces extending generally transversely of the sills and secured thereto, four portable pallet carriers removably and detachably secured to said pallet adjacent respective corners of the pallet, each pallet carrier comprising an elongated, rigid support arm having a free end insertable into the pallet underlying said crosspieces and having at an opposite end a caster wheel movable toward and away from the longitudinal axis thereof, means for manually moving the caster wheel away from the longitudinal axis of said support plate to raise the pallet when said support arm is underlying said crosspieces and for manually moving the caster wheel toward said longitudinal axis when the pallet is raised thereby to lower the pallet, and means on each support arm for releasably attaching the pallet carriers individually to the pallet for raising and lowering the pallet as the corresponding support arms are raised and lowered and comprising means effective to releasably attach the respective support arm to the pallet in response to the raising of the pallet and to detach the respective support arm when the pallet is lowered.

* * * * *